United States Patent [19]

Furukawa et al.

[11] Patent Number: 4,797,931
[45] Date of Patent: Jan. 10, 1989

[54] AUDIO FREQUENCY SIGNAL IDENTIFICATION APPARATUS

[75] Inventors: Yasuo Furukawa; Katsuyuki Yamazaki; Takemi Hosaka; Akira Fukui, all of Tokyo, Japan

[73] Assignees: Kokusai Denshin Denwa Co., Ltd.; NEC Corporation, both of Japan

[21] Appl. No.: 19,421

[22] Filed: Feb. 26, 1987

[30] Foreign Application Priority Data

Mar. 4, 1986 [JP] Japan ................................. 61-47596

[51] Int. Cl.$^4$ ............................................. H04R 29/00
[52] U.S. Cl. ....................................... 351/56; 364/484; 324/77 E; 324/77 G
[58] Field of Search .................. 379/237, 351, 386; 324/77 E, 77 G; 364/484

[56] References Cited

U.S. PATENT DOCUMENTS

| | | | |
|---|---|---|---|
| 3,416,081 | 12/1968 | Gutleber | 364/485 |
| 4,045,620 | 8/1977 | Westbrook | 379/386 |
| 4,510,601 | 4/1985 | Delpit et al. | 379/386 |
| 4,528,664 | 7/1985 | Cheng et al. | 379/386 |
| 4,599,567 | 7/1986 | Goupillaud et al. | 324/77 E |
| 4,640,134 | 2/1987 | Simmons | 324/77 E |
| 4,667,065 | 5/1987 | Bangerter | 379/351 |

Primary Examiner—Forester W. Isen
Attorney, Agent, or Firm—Laff, Whitesel, Conte & Saret

[57] ABSTRACT

An audio frequency signal identification apparatus of the present invention has a correlator for obtaining the full band power component and autocorrelation coefficients of a digital audio frequency signal to be identified for each analysis time, a plurality of band pass filters for dividing and filtering the audio frequency signal into a plurality of bands, a plurality of integrators for full wave rectifying and integrating the outputs from the plurality of band pass filters for each analysis time so as to obtain individual power components for the respective bands, a first identification parameter calculator for calculating a maximum power component, a minimum power component, a frequency band yielding the maximum power component, a bandwidth, and a difference between the individual band power components in the respective analysis times, from the individual band power components as the outputs from the plurality of integrators, a second identification parameter calculator for calculating a difference between the autocorrelation coefficients as the output of the correlator and a difference between the autocorrelation coefficients in the respective analysis times, an identification and judgement processor for judging the signal type of the audio frequency signal to be identified in accordance with which of a plurality of predetermined judgement conditions the identification parameters obtained from the first and second identification parameter calculator and the full band power component correspond and if they satisfy a condition of continuity.

4 Claims, 4 Drawing Sheets

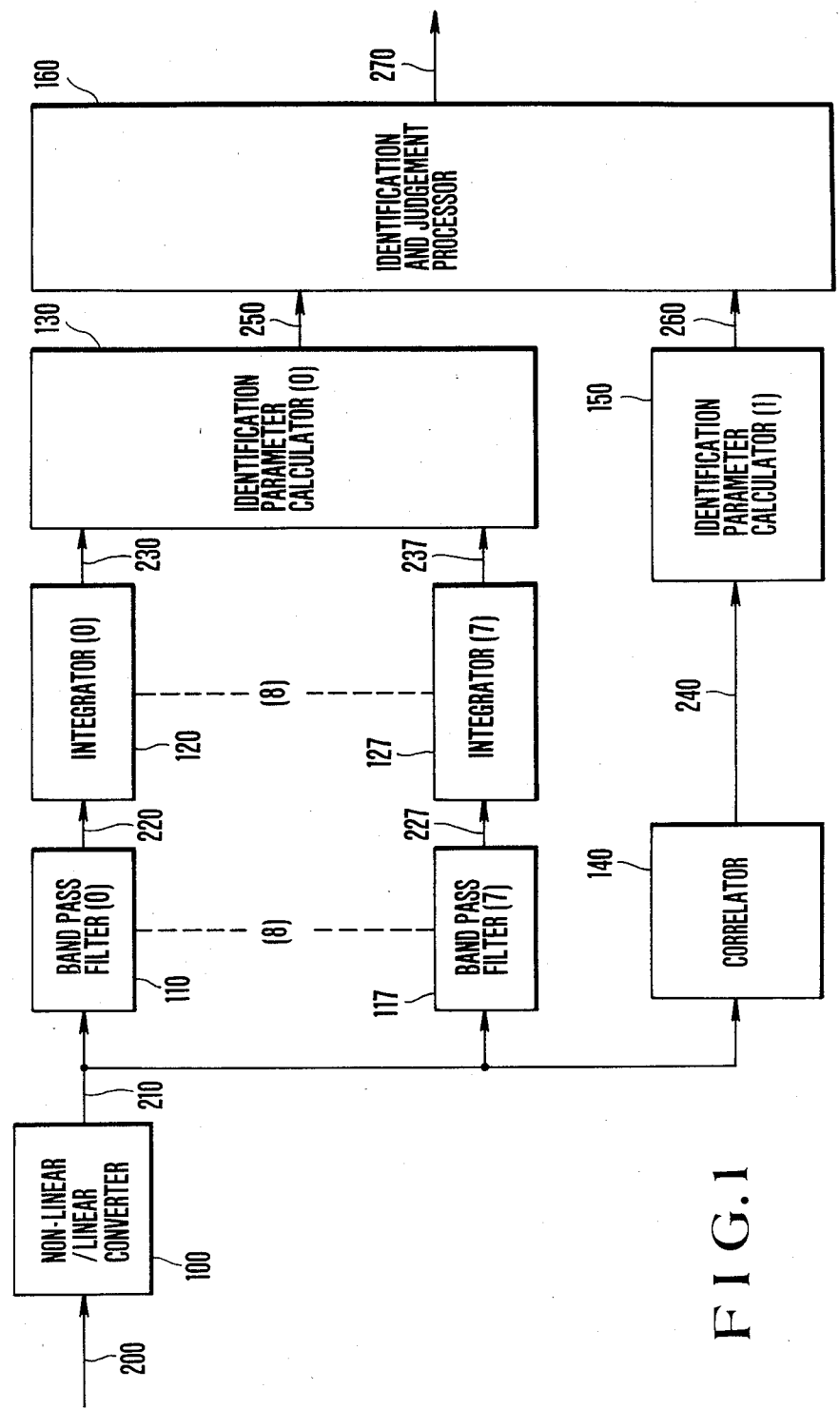
F I G. 1

AUDIO FREQUENCY SIGNAL IDENTIFICATION APPARATUS

BACKGROUND OF THE INVENTION

The present invention relates to an audio frequency signal identification apparatus for automatically identifying an audio frequency signal which appears on a telephone line in order to determine a service condition and the mode of the telephone line.

In an identification system of this type, types of signals are identified by analyzing a frequency spectrum and fluctuation over time of the frequency spectrum. This system is conventionally realized by an analog circuit as a line monitor arranged in a switching system.

For this reason, it is difficult to identify instantaneous voice data, identification precision is not so high, and a relatively long time is required for identification. Since the analog circuit is adopted, the hardware size is large even for several lines, and it is difficult to identify all the calls processed by the switching system at one time.

SUMMARY OF THE INVENTION

It is an object of the present invention to provide an audio frequency signal identification apparatus which can detect instantaneous voice data, can perform reliable identification in a short period of time, and can simultaneously process a large number of lines, due to an improved resolution of spectrum analysis, introduction of autocorrelation coefficients, and high-speed analysis.

The audio frequency signal identification apparatus of the present invention has a correlator for obtaining a full band power component and autocorrelation coefficients of a digital audio frequency signal to be identified for each analysis time, a plurality of band pass filters for dividing and filtering the audio frequency signal into a plurality of bands, a plurality of integrators for full wave rectifying and integrating the outputs from the plurality of band pass filters for each analysis time so as to obtain individual band power components for the respective bands, a first identification parameter calculation means for calculating a maximum power component, a minimum power component, a frequency band yielding the maximum power component, a bandwidth, and a difference between the individual band power components in the respective analysis times, from the individual band power components as the outputs from the plurality of integrators, a second identification parameter calculation means for calculating a difference between the autocorrelation coefficients as the output of the correlator and a difference between autocorrelation coefficients in the respective analysis times, identification and judgement processing means for judging the signal type of the audio frequency signal to be identified in accordance with which of a plurality of predetermined judgement conditions, the identification parameters obtained from the first and second identification parameter calculation means and the full band power component correspond and if they satisfy a condition of continuity.

In this invention, a noise level of a line is estimated from the minimum power component of the band power components, and a sound period is detected in comparison with the full band power component. As for an analysis time which is determined as a sound period, frequency characteristics are analyzed from the maximum power component frequency and the bandwidth, and time characteristics are analyzed from the individual band power components and fluctuations in autocorrelation coefficients, thereby judging continuity. Thus, a highly reliable identification result can be obtained in a short period of time.

BRIEF DESCRIPTION OF THE DRAWINGS

FIG. 1 is a block diagram showing an embodiment of the present invention;

DESCRIPTION OF THE PREFERRED EMBODIMENTS

Figure 2:
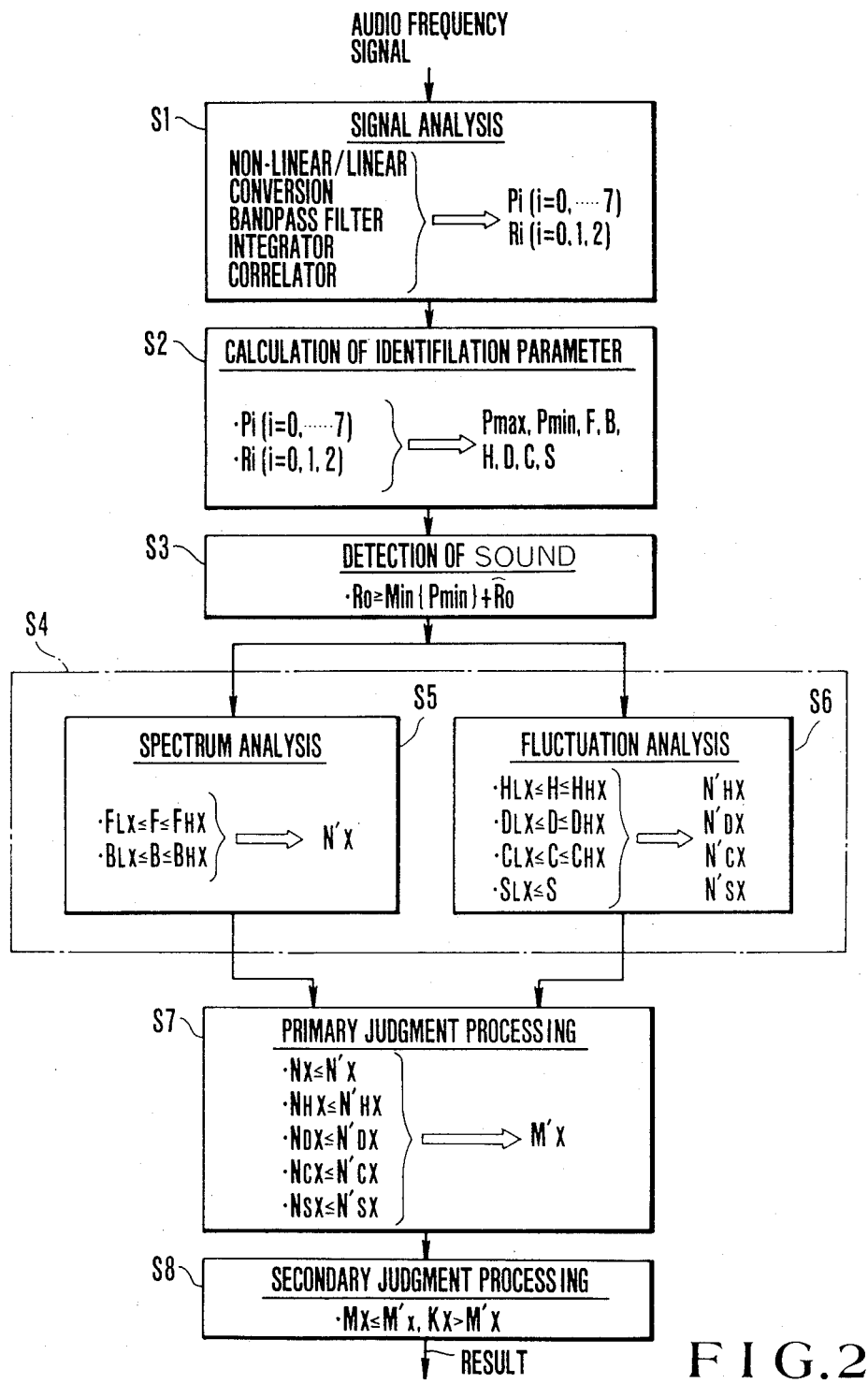
FIG. 2 is a flow chart for explaining the operation of the embodiment shown in FIG. 1.

An embodiment of the present invention will now be described with reference to the accompanying drawings.

Prior to the description of the detailed arrangement and operation of the present invention, the function of the present invention and an audio frequency signal identification algorithm will now be described.

In general, signals on the signaling system (such as seizing, answer, clear-forward signals, and the like), tone signals (such as ring-back tone, busy tone signals, and the like), voice signals (conversation), and data tones (facsimile signals and the like) appear on the telephone lines. When the types of signals on the telephone line are to be automatically identified, these signals must be processed in a real time manner. Note that "identification" is different from so-called "recognition" but means "being able to classify audio frequency signals into above four categories".

The audio frequency signals on the telephone lines can be identified by measuring their frequency components, their autocorrelation coefficients, time fluctuations of these coefficients, and their time durations. In this embodiment, signals except for the signaling system are identified, and are classified into six types, i.e., a Tone signal (T), a Voice signal (V), a Data Tone signal (D), an Acknowledge signal (A) flowing before and after data communication, Other signal (O) which cannot be classified although it includes a sound period, and Nothing (N). This classification can be updated by updating the judgement conditions. The audio frequency signal identification algorithm when the audio frequency signal is divided into 8 bands will be described below.

(1) The audio frequency signal is divided into 8 bands in consideration of characteristics of Voice and Tone, and individual band power components $P_i$ ($i=0, 1, \ldots, 7$) are calculated for each unit time (frame).

$P_0$: 300 to 600 Hz
$P_1$: 600 to 900 Hz
$P_2$: 900 to 1200 Hz
$P_3$: 1200 to 1600 Hz
$P_4$: 1600 to 2000 Hz
$P_5$: 2000 to 2400 Hz
$P_6$: 2400 to 2900 Hz
$P_7$: 2900 to 3400 Hz (2) The audio frequency signal is input to a correlator to calculate autocorrelation coefficients $R_i$ ($i=0, 1, 2$) for each frame.

$R_0$: 0th-order autocorrelation coefficient (full band power component)

$R_1$: First order autocorrelation coefficient $R_2$: Second order autocorrelation coefficient (3) The following identification parameters are defined from the above Pi (i=0, 1, ..., 7) and Ri (i=0, 1, 2).

Pmax: Maximum band power component Pi yielding Max{Pi} i=0 to 7

Pmin: Minimum band power component Pi yielding Min{Pi} i=0 to 7

F: Frequency band of maximum band power component
i yielding Pi=Pmax

B: Bandwidth Continuous bandwidth yielding $Pi \geq (\hat{P}max - \hat{P}max)$, where $\hat{P}max$ is semi-fixed value H: Interframe difference of first and second order autocorrelation coefficients $$\sum_{i=1}^{2} |Ri,j - Ri,j-1|,$$

where Ri,j is an i-th order autocorrelation coefficient of a jth frame

D: Interframe difference of band power components $$\sum_{i=0}^{7} |Pi,j - Pi,j-1|,$$

where Pi,j is power component Pi of band number i of a jth frame

C: Difference between first and second order autocorrelation coefficients $R_1 - R_2$ for $R_1 > 0$ and $R_2 < 0$ S: Difference between maximum and minimum values of individual band power components Pmax−Pmin (4) Sound periods are detected using $R_0$ and Pmin from the above definitions.

$R_0 \geq \text{Min}\{Pmin\} + \hat{R}_0 \ldots$

Min{Pmin} is the minimum value of the previous values of Pmin including current Pmin, and is $\hat{R}_0$ is a semi-fixed value (5) The audio frequency signal is identified for frames which are determined as sound periods in item (4) by the following logic under the definition of items (1) to (3).

(A) Frame Processing (a) Spectrum analysis (F,B judgement)

If X={V,D,A,T}, X is output as the F,B judgement result if the following condition is satisfied.

$(F_{LX} \leq F \leq F_{HX}) \cap (B_{LX} \leq B \leq B_{HX})$ where $F_{LX}$, $F_{HX}$, $B_{LX}$, and $B_{HX}$ are semi-fixed values which are set for V, D, A, and T, respectively. Note that a plurality of F,B judgement results may be output for one analysis frame.

(b) Fluctuation analysis (H,D,C,S judgement)

The following H,D,C,S judgement is performed for the X output in item (a).

$H_{LX} \leq H \leq H_{HX}$ $D_{LX} \leq D \leq D_{HX}$ $C_{LX} \leq C \leq C_{HX}$ $S_{LX} \leq S$ where $H_{LX}$, $H_{HX}$, $D_{LX}$, $D_{HX}$, $C_{LX}$, $C_{HX}$, and $S_{LX}$ are semi-fixed values set for V, D, A, and T, respectively.

(B) Primary judgement processing

If identical Xs are continuously output several times (Nx frames) in the spectrum analysis of item (a), the fluctuation condition between Nx frames are judged as primary judgement. More specifically, when H, D, C, and S, satisfy the judgement condition shown in item (b) over $N_{HX}$, $N_{DX}$, $N_{CX}$, and $N_{SX}$ frames, the primary judgement result "X" is output. $N_X$, $N_{HX}$, $N_{DX}$, $N_{CX}$, and $N_{SX}$ are semi-fixed values set for V, D, A, and T, respectively.

(C) Secondary judgement processing

When the primary judgement result X is continuously output for Mx times, the final identification result "X" is output. If frames which are determined as sound periods are produced No times, and no primary judgement result "X" is output during this interval, "O" is output as the primary judgement result, and if the primary judgement result "O" continues for Mo times, the final result "O" is output. Note that $M_X$ is a semi-fixed value set for V, D, A, and T, respectively, and No and Mo are semi-fixed values set for "O" respectively. If the primary judgement result X is output less than $K_X$ times during a predetermined identification time, the identification result "N" is output. $K_X$ is a semi-fixed value set for V, D, A, T, and O, respectively.

Referring to FIG. 1, an audio frequency signal 200 which is converted to digital data using a PCM code is converted to a linear code by a non-linear/linear converter 100. An audio frequency signal 210 which is converted to the linear code is input to eight band pass filters of band pass filter(0) 110 to band pass filter(7) 117 and a correlator 140. The band pass filters 110 to 117 filter the audio frequency signal 210 for each band. The filtered signals 220 to 227 are respectively input to eight integrators of integrator(0) 120 to integrator(7) 127, thereby obtaining individual band power components 230 to 237 for each frame. An identification parameter calculator(0) 130 calculates the maximum value Pmax of the band power components, the minimum value Pmin of the band power components, the maximum power component frequency band F, the bandwidth B, the interframe difference D of the band power components, and the difference S between the maximum and minimum values of the band power components in item (3) above. On the other hand, the correlator 140, to which the linear-encoded audio frequency signal 210 is input, calculates the 0-th order, first, and second order autocorrelation coefficients 240 for each frame, and outputs them to an identification parameter calculator(1) 150. The identification parameter calculator(1) 150 calculates the interframe difference H of the first and second order autocorrelation coefficients and the difference C of the first and second order autocorrelation coefficients defined in item (3). An identification and judgement processor 160 performs identification and judgement processing of the input audio frequency signal 200 using the identification parameters 250 and 260 calculated by the identification parameter calculator(0) 130 and the identification parameter calculator(1) 150 in accordance with the identification algorithm defined in items (4) and (5), thereby obtaining the identification result 270.

The signal identification processing of the audio frequency signal identification apparatus shown in FIG. 1 will now be described with reference to the flow chart shown in FIG. 2. Referring to FIG. 2, the band power components Pi and the autocorrelation coefficients Ri are obtained from the input audio frequency signal by the band pass filters, the integrators, and the correlator, in step S1 (signal analysis; 100, 110 to 119, 120 to 127, 140 in FIG. 1). In step S2, identification parameters Pmax, Pmin, F, B, H, D, S, C, and $R_0$ are calculated from the band power components Pi and the autocorrelation coefficients Ri (identification parameter calculation; 130, 150 in FIG. 1). Sound periods are detected using the $R_0$ and Pmin of the identification parameters in step S3 (sound detection; 160 in FIG. 1), and frame processing (160 in FIG. 1) is performed for the frame which is determined as the sound period, in step S4. In this frame processing, spectrum analysis (F,B judgement) in step S5 and fluctuation analysis (H,D,C,S judgement) in step S6 are performed. In the primary judgement processing (160 in FIG. 1) in step S7 after the frame processing, continuity and fluctuation of the output of the frame processing in unit time are judged, and the primary judgement result is output. In the secondary judgement processing (160 in FIG. 1) in step S8, the continuity of the primary judgement result is judged, thereby obtaining the final identification result.

Figure 3:
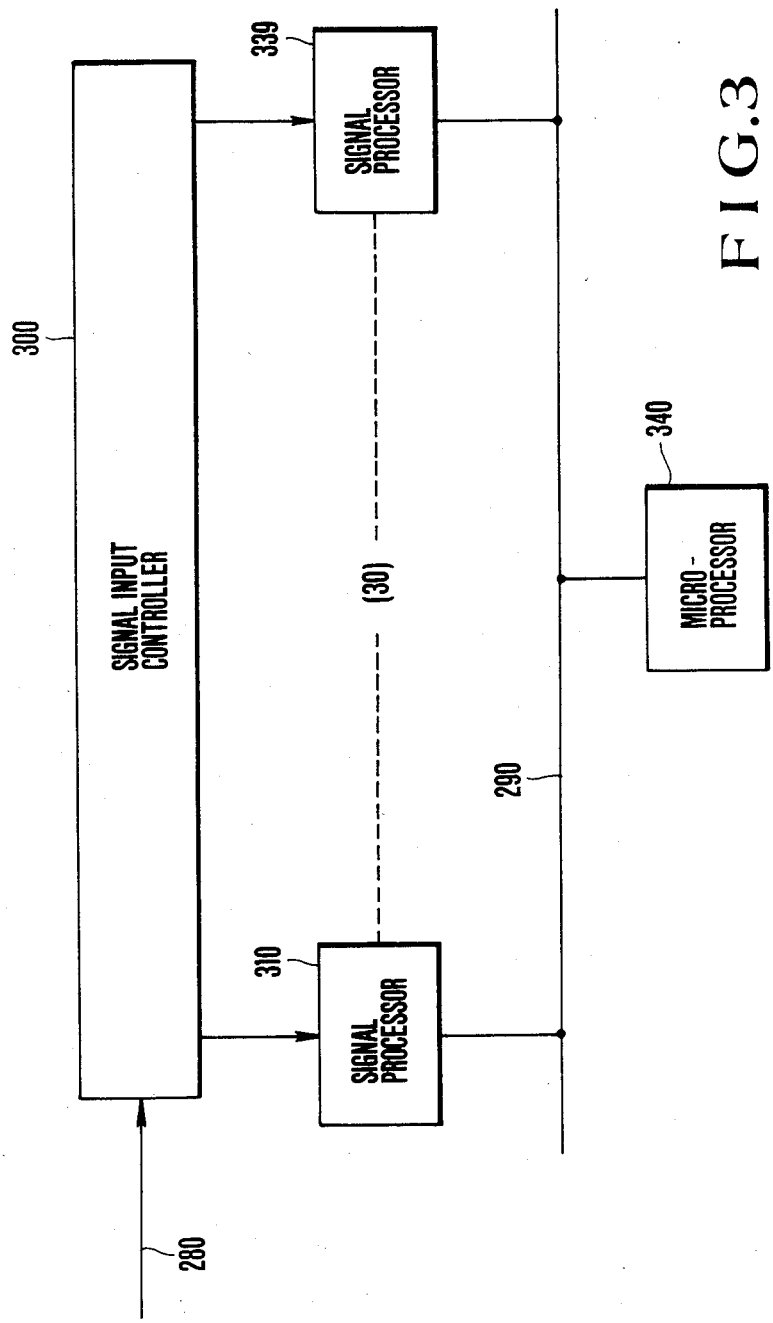
FIG. 3 is a block diagram showing another embodiment of the present invention.

FIG. 3 is a block diagram showing an audio frequency signal identification apparatus according to embodiment, a case of 30-channel multiple processing will be described. Referring to FIG. 3, a 30-channel multiplex input audio frequency signal 280 is input to a signal input controller 300, and is decomposed into speech signals for each channel so as to be sent to 30 signal processors 310 to 339 corresponding to the respective channels. These signal processors 310 to 339 execute the functions of the band pass filters 110 to 117, the integrators 120 to 127, the correlator 140 and the identification parameter calculators 130 and 150 excluding the parameters S and C in the embodiment shown in FIG. 1 for each channel, and the identification parameters Pmax, Pmin, F, B, H, D, $R_0$, $R_1$, and $R_2$ are sent to a microprocessor 340 through a microprocessor bus 290. The microprocessor 340 calculates the parameters S and C using the identification parameters received from the signal processors 310 to 339, and executes the function of the identification and judgement processor 160 in the embodiment shown in FIG. 1.

Figure 4:
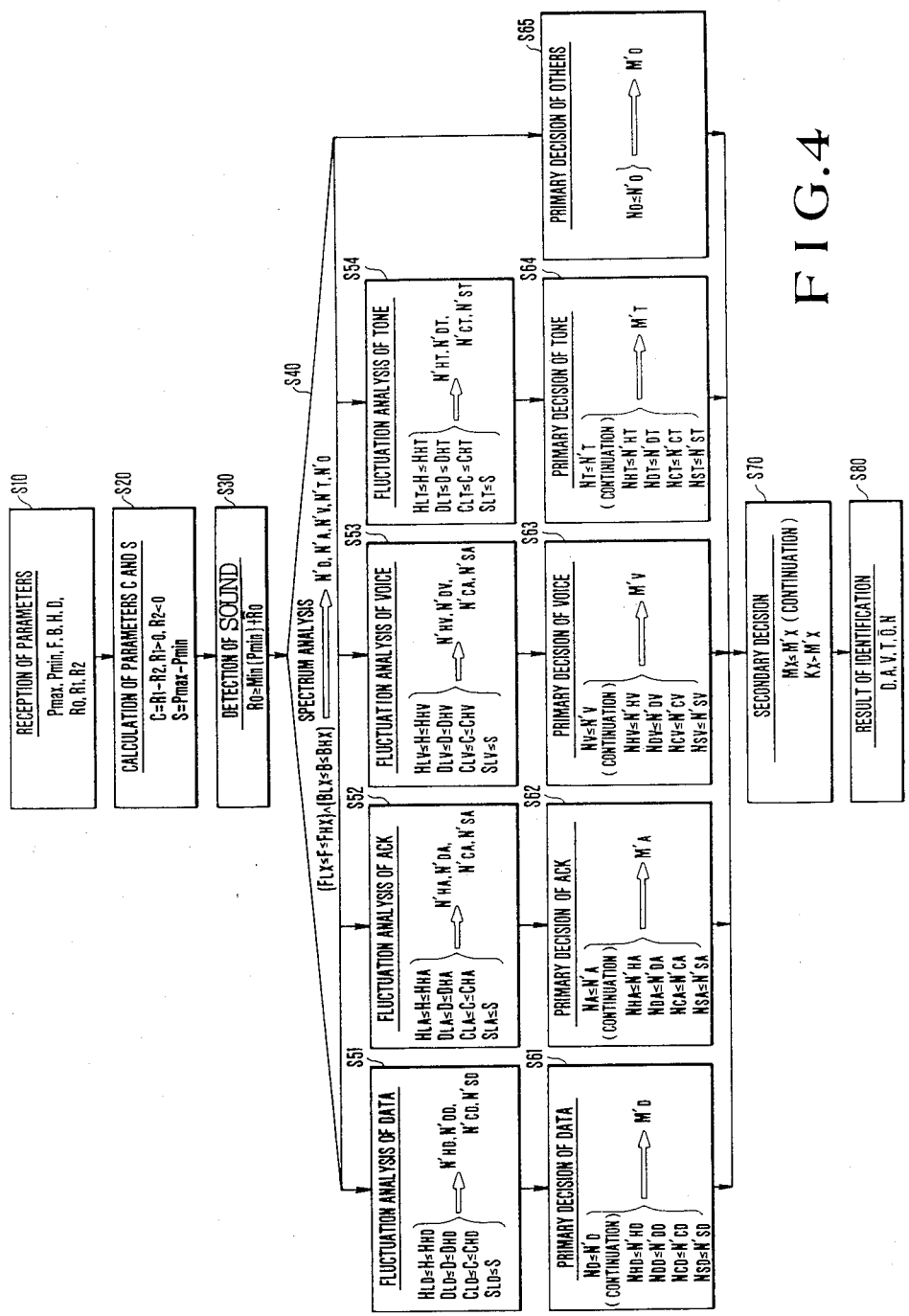
FIG. 4 is a flow chart for explaining the operation of the embodiment shown in FIG. 3.

FIG. 4 is a flow chart for explaining the operation of the embodiment shown in FIG. 3. Referring to FIG. 4, the parameters Pmax, Pmin, F, B, H, D, $R_0$, $R_1$, and $R_2$ are received from the signal processors 310 to 339 in step S10, and the parameters C and S are calculated based thereon (step S20). Furthermore, sound detection is performed (step S30). In step S40, spectrum analysis (F,B judgement) is performed for the frames which are determined as sound periods in the sound detection. Fluctuation analysis is performed for classified Data, Ack, Voice, and Tone (steps S51, S52, S53, and S54). In steps S61 to S65, primary judgement for judging continuity and fluctuation in a given time of the results of the spectrum analysis and fluctuation analysis is performed. Steps S51 to S54 and steps S61 to S65 may be executed for a plurality of parameters in accordance with the result of the spectrum analysis (S40). In the processing of the primary judgement (S61 to S65), one type of a signal can be identified. In the secondary judgement in step S70, continuity is judged based on the result of the primary judgement, thereby obtaining the final identification result V, D, A, T, O and N. (S80).

In the above arrangement, 30-channel multiplex processing is performed. However, the system of the present invention can be applied to multiplexing of desired degree.

According to the present invention as described above, the digital audio frequency signal is analyzed using the band pass filters, integrators, and the correlator, and the identification parameters are calculated from the individual band power components and the autocorrelation coefficients obtained therefrom. The range, time fluctuation, and continuity of these parameters are judged, thereby obtaining highly reliable identification results within a short period of time. In addition, signal identification processing for a large number of lines can be performed at the same time.

What is claimed is:

1. An audio frequency signal identification apparatus for identifying a signal type of an audio frequency signal presented in unit analysis times of multiplexed frames, comprising:

a correlator for calculating a full band power component first and second order autocorrelation coefficients of a digital audio frequency signal to be identified for each unit analysis time;

a plurality of band pass filters, provided for predetermined bands, for filtering the audio frequency signal to be identified in the respective bands;

a plurality of integrators, which are connected to said plurality of band pass filters in a one to one correspondence, for full wave rectifying and integrating the outputs from said band pass filters for the unit anlysis time so as to obtain individual band power components;

first identification parameter calculation means for calculating a maximum power component, a minimum power component, a frequency band F yielding the maximum power component, a bandwidth B, a difference between the individual band power component in the respective analysis times from the individual band power components output from said plurality of integrators;

second identification paramter calculation means for calculating a difference between two values of the first order autocorrelation coefficient outputted from said correlator for different unit analysis times, a difference between two values of the second order autocorrelation coefficient outputted from said correlator for the difference unit analysis times, and a difference between respective values of the first and second order autocorrelation coefficients for a same unit analysis time; and identification and judgement processing means for judging a signal type of the audio frequency signal to be identified in accordance with which of a plurality of predetermined judgement conditions the identication parameters obtained from said first and second identification parameter calculation means and the full band power component of the digital audio frequency signal correspond and if they satisfy a condition of continuity.

2. An apparatus according to claim 1, wherein said identification and judgement processing means comprises means for detecting sound periods based on the outputs from said first and second identification parameter calculation means, spectrum analysis means for producing an output indicating that both the values of the frequency band F of the maximum power component and the bandwidth B in which an individual band power component continuously satisfies predetermined condition fall in predetermined ranges, fluctuation analysis means for producing an output indicating that an interframe difference H of the first and second order autocorrelation coefficients, an interframe difference D of the respective band power components, a difference C between the first and second order autocorrelation coefficients, and a difference S between maximum and minimum values of the band power components fall in predetermined ranges, respectively, based on the output form said spectrum analysis means, primary judgement processing means for producing an output indicating that the outputs from said spectrum analysis means and said fluctuation analysis means continuously satisfy predetermined conditions a predetermined number of times, and secondary judgement processing means for producing a final judgement result indicating a signal type of said audio frequency signal when said primary judgement processing means satisfies a predetermined condition a predetermined number of times.

3. An audio frequency signal indentificaton apparatus comprising:

signal input control means for receiving a multiplex audio frequency signal comprising a sequence of frames for a plurality of channels and demultiplexing and outputting it as signals for the respective channels;

a plurality of signal processors, connected to the respective output channels of said signal input control means, for outputting, for each channel and frame, a plurality of identification parameters including 0th-order, first and second order autocorrelation coefficients $R_0$, $R_1$, and $R_2$, a maximum band power component Pmax, a minimum band power component Pmin, a frequency band F of the maximum band power component, a bandwidth B in which the band power component continuously satisfies a predetermined condition, an interframe difference H of the first and second order, autocorrelation coefficients, and an interframe difference D of the respective maximum and minimum band power components; and a microprocessor for calculating a difference C between the first and second order autocorrelation coefficients and a difference S between maximum and minimum values of the band power components based on the outputs from said plurality of signal processors, and judging the type of the input signal by applying a plurality of judgement conditions in correspondence with said identification parameters Pmax, Pmin, F, B, H, D, S, and C.

4. An apparatus to claim 3, wherein said miroprocessor detects a sound period based on the identification parameters Pmax, Pmin, F, B, H, D, S, and C, performs spectrum analysis for the detected sound period to classify it into five types of signals, namely, "Data", "Acknowledge", "Voice", "Tone", and "others", performs fluctuation analysis for judging a fluctuation in a predetermined period of time for each type of signal, performs primary judgement processing for determining each type of a signal based on the result of the fluctuation analysis, and performs secondary judgement processing for summarizing the primary judgement processing performed for each signal type so as to duge continuity, thereby outputting a final identification result.

* * * * *